United States Patent [19]

Fujiyama et al.

[11] Patent Number: 6,052,728

[45] Date of Patent: Apr. 18, 2000

[54] METHOD OF COLLECTIVELY MANAGING DISPERSIVE LOG, NETWORK SYSTEM AND RELAY COMPUTER FOR USE IN THE SAME

[75] Inventors: Tatsuya Fujiyama, Yokohama; Makoto Kayashima, Yamato; Masato Terada, Sagamihara; Osamu Katsumata, Yokohama, all of Japan

[73] Assignee: Hitachi, Ltd., Tokyo, Japan

[21] Appl. No.: 09/003,878

[22] Filed: Jan. 7, 1998

[30] Foreign Application Priority Data

Jan. 8, 1997 [JP] Japan ................................. 9-001551

[51] Int. Cl.[7] ................................. G06F 11/30
[52] U.S. Cl. ..................... 709/224; 709/236; 370/401
[58] Field of Search .................................. 709/222, 224, 709/223, 236; 370/401, 400

[56] References Cited

U.S. PATENT DOCUMENTS

| | | | |
|---|---|---|---|
| 5,056,085 | 10/1991 | Vu | 370/400 |
| 5,097,469 | 3/1992 | Douglas | 714/712 |
| 5,337,307 | 8/1994 | Sato et al. | 370/397 |
| 5,764,626 | 6/1998 | VanDervort | 370/232 |
| 5,793,976 | 8/1998 | Chen et al. | 709/224 |

OTHER PUBLICATIONS

J. Case, et al., "A Simple Network Management Protocol (SNMP)" rfc1157, May 1990.

*Primary Examiner*—Kenneth Coulter
*Attorney, Agent, or Firm*—Antonelli, Terry, Stout & Kraus, LLP

[57] ABSTRACT

In a network system in which each of multiple networks, each containing computers and relay computers, is connected to another network via multiple relay computers which belong to the network concerned, and the communication between two computers belonging to different networks is performed on a communication path via multiple relay computers, there is provided a management computer for collectively managing logs which are dispersively and separately recorded in the multiple respective relay computers.

7 Claims, 16 Drawing Sheets

FIG. 9

| REQUEST INFORMATION | SEARCH CONDITION | | | | |
|---|---|---|---|---|---|
| | APPLICATION NAME | CONNECTION TIME RANGE | USER ID | CONNECTION ORIGIN | CONNECTION TARGET |
| USER ID | TELNET | 1996/08/08 : 00 : 00 : 00<br>1996/08/08 : 22 : 59 : 59 | | | --- |
| | | | | | --- |

| 101 | | | | | | |
|---|---|---|---|---|---|---|
| | REQUEST INFORMATION NUMBER | SEARCH CONDITION NUMBER | SEARCH CONDITION ITEM NUMBER | CONDITION DATA | SEARCH CONDITION ITEM NUMBER | CONDITION DATA | ----- |
| | 1102 | 1103 | 1104 | 1105 | 1104 | 1105 |

FIG. 12

| SESSION IDENTIFIER | ADDRESS OF REPLY COMPUTER | REQUEST INFORMATION ITEM ||||
|---|---|---|---|---|---|
| | | USER ID | LOG OUTPUT TIME | CONNECTION ORIGIN | CONNECTION TARGET |
| 1121 | 1122 | 1123 ||||
| ---- | ---- | ---- | ---- | ---- | ---- |

FIG. 13

LOG MESSAGE FORMAT TABLE

| LOG MESSAGE |
|---|
| #1 #2 #3 [#4] CONNECT FROM #6 |
| #1 #2 #3 [#4] : PARMIT USAR #5 FROM #6 TO #7 |
| ... |

INFORMATION CODE DEFINING TABLE

| | DATA AND HOUR | APPLICATION NAME | HOST NAME | PROCESS ID | USER ID | CONNECTION ORIGIN | CONNECTION TARGET |
|---|---|---|---|---|---|---|---|
| INFORMATION CODE | 1 | 2 | 3 | 4 | 5 | 6 | 7 |
| CHARACTER ARRAY LENGTH | | | | | | | ----- |
| | | | | | | | ----- |
| | | | | | | | ----- |

FIG. 16A

| 162 | 163 | 164 | 165 | 165 | |
|---|---|---|---|---|---|
| SESSION IDENTIFIER | REPLY INFORMATION NUMBER | DATA NUMBER | DATA 1 | DATA 2 | ----- |

| 166 | 167 |
|---|---|
| ADDRESS | REPLY DATA |

165

METHOD OF COLLECTIVELY MANAGING DISPERSIVE LOG, NETWORK SYSTEM AND RELAY COMPUTER FOR USE IN THE SAME

BACKGROUND OF THE INVENTION

1. Field of the Invention

The present invention relates to a technique for managing logs recorded in relay computers in a network system where computers belonging to various different networks perform communications with one another through a communication path via multiple relay computers.

2. Description of Related Art

Logs have hitherto been used to ascertain a communication status in a client/server system. For example, in the communication between a telnet client and a telnetd server of the UNIX system, a user ID which generates a connection, a connection start time, the name of a client computer in which a telnet client is started, etc. are recorded as a log in a server computer in which the telnetd server is started. Therefore, a network administrator can ascertain who accesses the server computer by referring to this log.

Further, when some problem occurs during communication, the nature of the problem can be output to the log, and further the cause of the problem can be specified by using this function.

The following methods exist as a method of grasping the communication status with no log;

(1) Notification of a communication problem which is defined by X.25 in the same network, (2) Notification of a problematic computer in a network management based on SNMP, etc.

Recently, the client/server system in an open network has been more and more widespread as the internet, etc. propagates. In the open network, a firewall is usually set up to ensure security of an internal network from an unauthorized access from external ones.

The firewall is actually realized by a relay computer having a firewall function, and the communication between the client and the server is performed via a relay computer having the firewall function.

Recently, in order to perform careful security management, multiple relay computers each of which has the firewall function are interposed in a communication path between the client and the server, and thus the client/server system is being developed into a system in which multiple computers work in cooperation with one another.

In a relay computer having the firewall function, a user who uses the relay computer, a connection start time, the name of a client computer, etc. are recorded in the log of the relay computer to check the usage status of the network system. Therefore, when some problem occurs during communication between the client and the server, the network administrator refers to the log recorded by the relay computer to specify the location at which the problem occurs and the cause of the problem.

However, when multiple relay computers are disposed in the communication path between the client and the server, in order to specify the problematic location and the problem cause, the network administrator must visit the relay computers one by one to check all the logs recorded by the respective apparatuses, and thus the logs which are dispersively recorded in the relay computers cannot be checked at one place.

SUMMARY OF THE INVENTION

According to an object of the present invention, in such a network system where two computers belonging to different networks communicate with each other through a communication path via multiple relay computers, the multiple relay computers on the communication path work in cooperation with one another so that logs which are dispersively recorded in these relay computers can be collectively managed by one management apparatus.

In order to attain the above object, the present invention includes a network system with a function of collectively managing dispersive logs which includes multiple networks having relay computers and computers, and a network comprising the relay computers which are connected to one another, the communication between the computers which belong to different networks being performed via multiple relay computers, characterized by further including a management computer comprising:

means for receiving a log-check instruction, means for transmitting request information of the log check to a relay computer belonging to the same network as the computer concerned; and means for receiving result information of the log check and means for outputting the result information, wherein each of the relay computers comprises log recording means for recording log information on a communication relayed by the relay computer and identifier information for identifying the communication while associating the log information and identifier information with each other, log check means for searching the log information corresponding to the request information of the log check which is received from the management computer or another relay computer and generating the result information of the log check, request information transmitting means for transmitting the request information of the log check to another relay computer, and means for transmitting the result information thus generated and the result information received from the other relay computer to a relay computer or a management computer which is a request origin.

According to the present invention, when request information of the log check is sent from the management computer, log information of the desired communication within the communication being conducted among the entire network being connected via the relay computers will all be collected at the management computer. Accordingly, by inputting log-check instruction to the management computer, a network administrator can manage log information which are dispersively managed at a plurality of relay device.

In the present invention, the management computer is disposed to belong to any of the network.

Further, the request information of the log check is successively transferred among all the relay computers which relay the communication corresponding to the request information, and the result information of the log check is successively accumulated and transferred in the direction opposite to the transfer direction of the request information.

Further, each of the client computers comprises means for generating the identifier information for identifying a communication on a communication path when the computer-stablishes the communication path with another computer belonging to a network to which the computer concerned does not belong, and means for transmitting the identifier information to a relay computer which establishes a communication path with the computer concerned, and wherein the relay computer includes means for transmitting the identifier information received from the client computer or another relay computer to another relay computer which establishes a communication path with the relay computer concerned.

Further, the identifier information transmitted from the computer is generated so as to contain at least one of an identifier for a user of the computer concerned, the name of an application program which is started by the user, the date and time at which the communication path is established, the address of the network of the computer concerned and a process identifier which is added at the start time of the application program.

Further, the request information transfer means of the relay computer transmits the identifier information corresponding to the received request information as request information of log check, and the log check means of the relay computer searches the log information on the basis of the identifier information when the identifier information is received as the request information of the log management.

Further, the request information transmitting means of the relay computer judges on the basis of the storage content of the log recording means whether there is a relay computer to which the request information should be transmitted.

BRIEF DESCRIPTION OF THE DRAWINGS

The present invention will be more apparent from the following detailed description, when taken in conjunction with the accompanying drawings, in which:

FIG. 9 is a diagram showing an example of a display for inputting a log check instruction by a network administrator;

FIG. 10 is a diagram showing an example of the format of a request packet which is transmitted to a relay computer by the log monitor manager program;

FIG. 12 is a diagram showing an example of an output display of a check result;

FIG. 13 is a diagram showing an example of a log format data base;

FIG. 16A is a diagram showing an example of the format of a reply packet which the log monitor agent receives from another relay computer;

FIG. 16B is a diagram showing an example of the format of a reply packet which the log monitor agent receives from another relay computer.

DETAILED DESCRIPTION OF THE PREFERRED EMBODIMENTS

The present invention will be described in detail with reference to the accompanying drawings, particularly by using an embodiment in which the present invention is applied to a corporation network.

Figure 1:
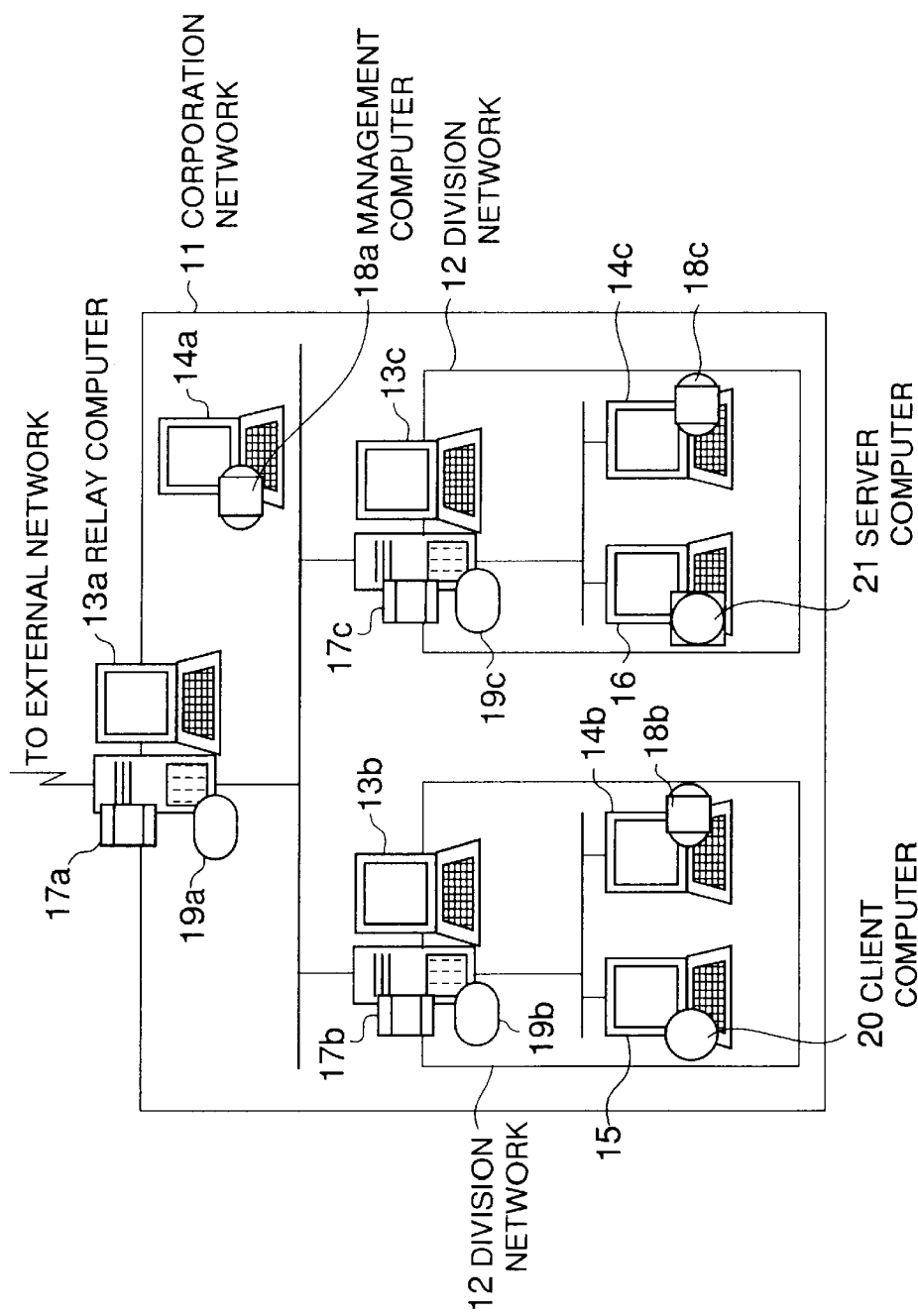
FIG. 1 is a block diagram showing the overall construction of a corporation network according to an embodiment of the present invention.

FIG. 1 is a block diagram showing the overall construction of a corporation network of an embodiment of the present invention.

In FIG. 1, reference numeral 11 represents a corporation network, reference numeral 12 represents a division network in the corporation network 11, reference numeral 13 represents a relay computer for connecting the network 11, 12 and an external network, reference numeral 14 represents a management computer which is used when a network administrator performs a log management, and reference numerals 15, 16 represent computers in which various applications are performed (reference numeral 16 represents a client computer for implementing a function as a client when a client program 20 is started, and reference numeral 16 represents a server computer for implementing a function as a server when a server program 21 is started).

These computers are connected to each other by a local area network (LAN), and the relay computer 13 usually has a firewall function of controlling an access between a network to which the relay computer 13 concerned belongs and a network at the outside of the network (i.e., an external network).

In the relay computer 13 a relay program 17 is started in which a connection with another computer is established at the time when a session between a client and a server (for example, the client computer 15 and the server computer 16) is established, and a communication between the client and the server is relayed after the session between the client and the server is established. A log monitor agent program 19 is also started, in which the relay computers 13 analyze logs in cooperation with one another.

In the management computer 14 a log monitor manager program 18 is started in which a log-check request from the network administrator is received and analysis results of logs from the relay computers 13 are collected to display the collected result.

As shown in FIG. 1, the corporation network 11 to which the present invention is applied has such a structure that each of multiple division networks 12 is connected to the other networks through the relay computer 13 which belongs to the division network concerned, and the communication between two computers which belong to different division networks 12 respectively (for example, the client computer 15 and the server computer 16) is performed through a communication path via multiple relay computers 13.

According to such a network, when some problem occurs in a communication between a client and a server, the network administrator has hitherto had to gain from each of all the relay computers 13 on the communication path a log in which the communication status of the relay computer 13 is recorded, and check the log thus obtained to specify the location of a problem and the cause of the problem. However, according to this embodiment, all the relay computers on the communication path work in cooperation with one another to exchange information with the other relay computers, so that the network administrator can manage logs by using only one management device 14.

Therefore, according to this embodiment, each relay computer 13 has a function of adding a log with a session identifier for identifying a session between a client and a server and recording the log with the session identifier, and also the client computer 15 has a function of generating and transmitting the session identifier.

Figure 2:
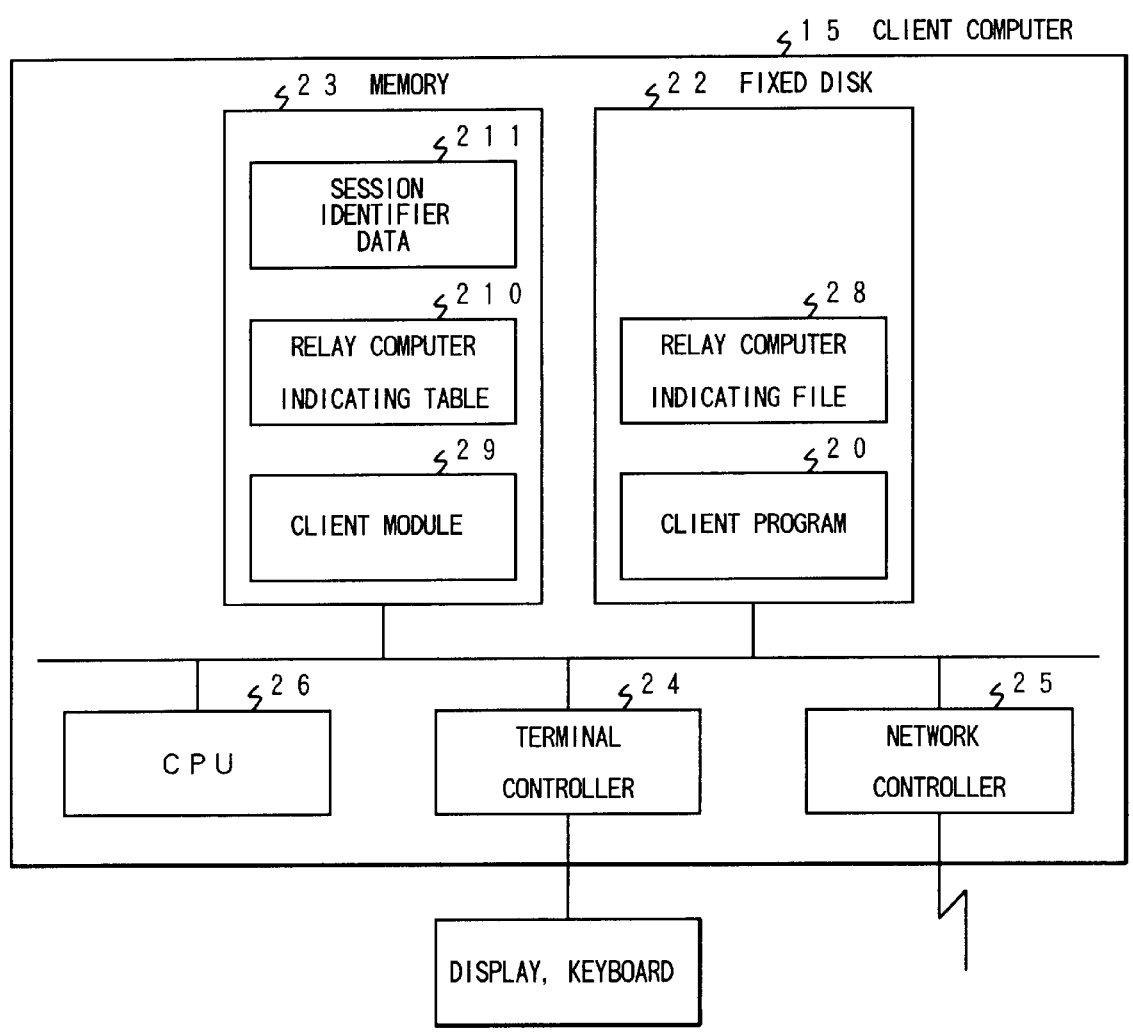
FIG. 2 is a block diagram showing the hardware construction of a client computer.

FIG. 2 is a block diagram showing the hardware construction of the client computer 15.

As shown in FIG. 2, the client computer 15 is connected to a display and a keyboard as input/output equipment.

Further, the client computer 15 has a CPU 26 for controlling each block provided therein and executing the program, a fixed disk 22, a memory 23, a terminal controller 24 for controlling the display and the keyboard which are connected to the terminal controller 24, and a network controller 25 for controlling the line with other computers.

In the fixed disk 22 there are stored the client program 20 and a relay computer indicating file 28 for indicating a relay computer 13 which is a destination (target) to be connected.

The client program 20 and the relay computer indicating file 28 may also be retrieved from a storage medium as a floppy disk, ROM, etc. or from a storage device of a server connected to a network which is connected to the client computer 15, and stored in the fixed disk 22.

In the relay computer indicating file 28 there are registered the address of the relay computer 13 which belongs to the same network as the client computer 15.

Further, in the memory 23 there are stored a client module 29, a relay computer indicating table 210, and a session identifier data 211 for identifying the session between a client and a server.

The session identifier data 211 is constructed of a user ID, the name of an application, a connection start date and time, the address of the client computer 15, and a process ID.

Figure 3:
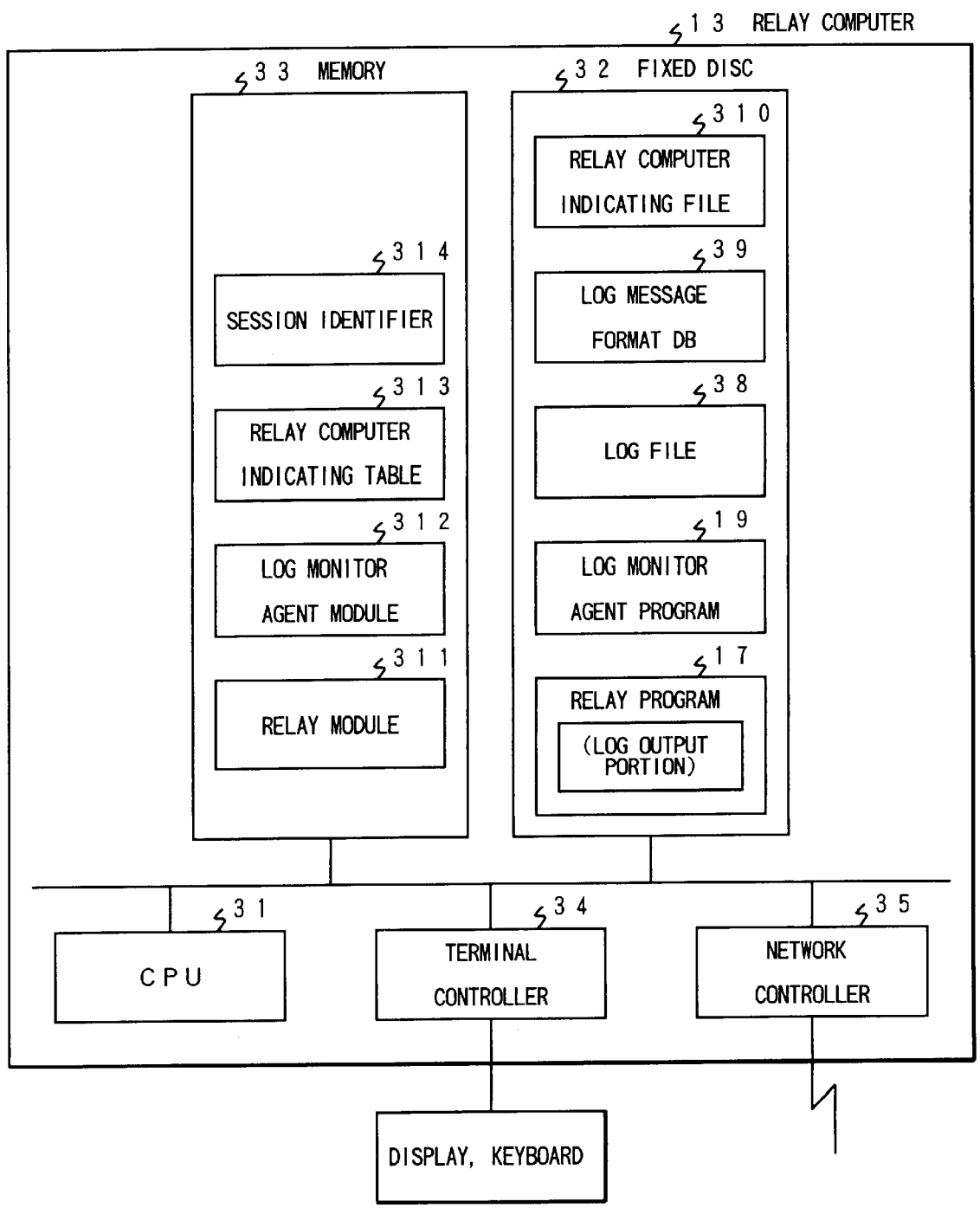
FIG. 3 is a block diagram showing the hardware construction of a relay computer.

FIG. 3 is a block diagram showing the hardware construction of the relay computer 13.

As shown in FIG. 3, the relay computer 13 is connected to a display and a keyboard as input/output equipment.

The relay computer 13 has a CPU 31 for controlling each block provided therein and executing the program, a fixed disk 32, a memory 33, a terminal controller 34 for controlling the display and the keyboard which are connected thereto, and a network controller 35 for controlling the line with other computers.

In the fixed disk 32 there are stored a relay program 17 for relying the connection between the client and the server and outputting to a log file a log indicating the status of the communication at the relay time, a log file 38, a log monitor agent program 19 for monitoring and analyzing the log file 38, a log message format DB39 serving as a data base (DB) which defines the format of a log message which is used for analysis of the logs by the log monitor agent program 19, and a relay computer indicating file 310 for indicating a relay computer 13 which is a destination (target) to be next connected.

The relay program 17 and the log monitor agent program 19, and the log message format DB39 and the relay computer indicating file 310 may also be retrieved from a storage medium such as a floppy disk, ROM, etc. or from a storage device of a server connected to a network which is connected to the relay computer 13, and stored in the fixed disc 32.

In the relay computer indicating file 310 there are registered the addresses of relay computers 13 which respectively belong to all the external networks connected to a network to which the relay computer concerned 13 belongs.

Further, in the memory 33 there are stored a relay module 311, a log monitor agent module 312, a relay computer indicating table 313 and a session identifier 314.

The session identifier 314 is uniquely generated from the session identifier data 211 as described later.

Figure 4:
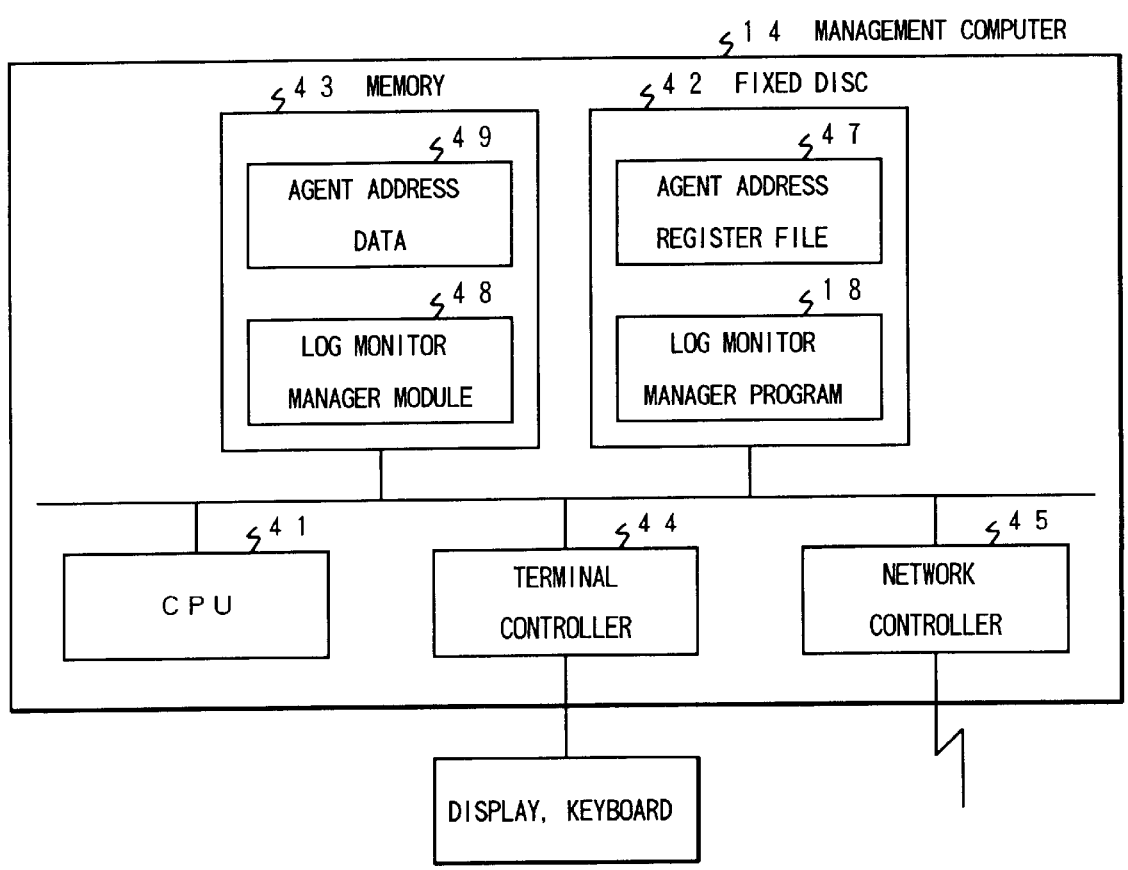
FIG. 4 is a block diagram showing the hardware construction of a management computer.

FIG. 4 is a block diagram showing the hardware construction of the management computer 14.

As shown in FIG. 4, the management computer 14 is connected to the display and the keyboard as input/output equipment.

Further, the management computer 14 includes a CPU 41 for controlling each block provided therein and executing the program, a fixed disk 42, a memory 43, a terminal controller 44 for controlling the display and the keyboard connected thereto, and a network controller 45 for controlling the line with other computers.

In the fixed disk 42 there are stored a log monitor manager program 18 for receiving an input from the keyboard and requesting a log check to the log monitor agent program 19 which is started in the relay computer 13 to display a check result on the display, and an agent address register file 47 for indicating a relay computer 13 which is a request destination (target) of the log check.

The log monitor manager program 18 and the agent address register file 47 may also be retrieved from a storage medium such as a floppy disc, ROM, etc. or from a storage device of a server connected to a network which is connected to the management computer 14, and stored in the fixed disk 42.

In the agent address register file 47 there are registered the addresses of all the relay computers 13 which belong to the same network as the management computer 14 concerned.

Further, in the memory 43 there are stored a log monitor manager module 48 and an agent address data 49.

Figure 6:
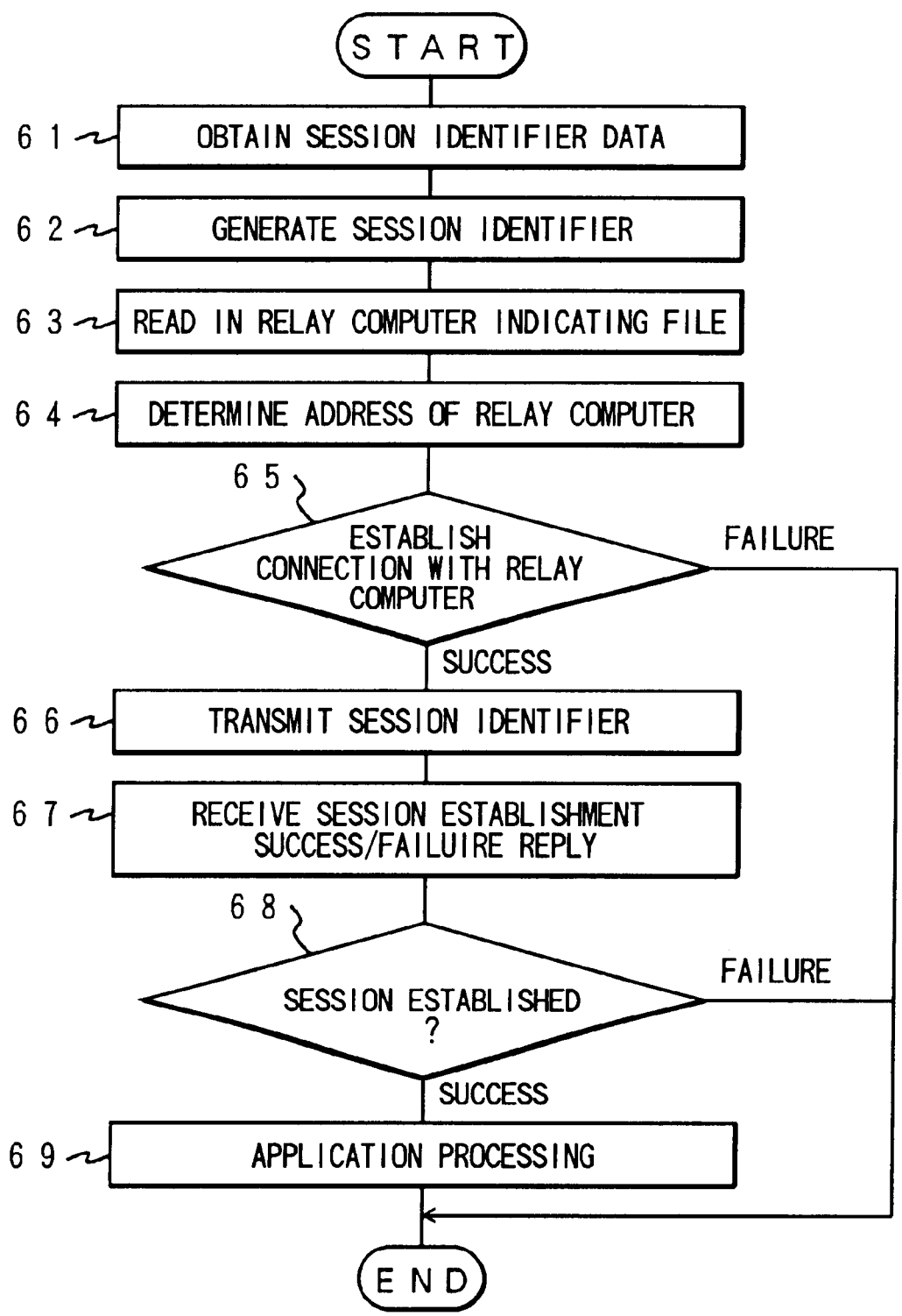
FIG. 6 is a flowchart showing the processing of a client program which is started in a client computer.

FIG. 6 is a flowchart showing the processing of the client program 20 which is started in the client computer 15.

The client program 20 is started upon boot-up process of the client computer 15, and stored as the client module 29 in the memory 23. The client program 20 implements the processing shown in FIG. 6 when a user who uses the client computer 15 starts an application program which needs to access the server program 21 which is executed in the server computer 16.

That is, as shown in FIG. 6, the client program 20 first gains the user ID, the application name, the connection start date and time, the address of the client computer 15 and the process ID from the OS of the client computer 15, and stores these information as session identifier data 211 into the memory 23 (step 61). The process ID is provided by the OS of the client computer 15 at the time when the application program is started. Subsequently, the client program 20 generates the session identifier from the session identifier data 211 (step 62).

Figure 17:
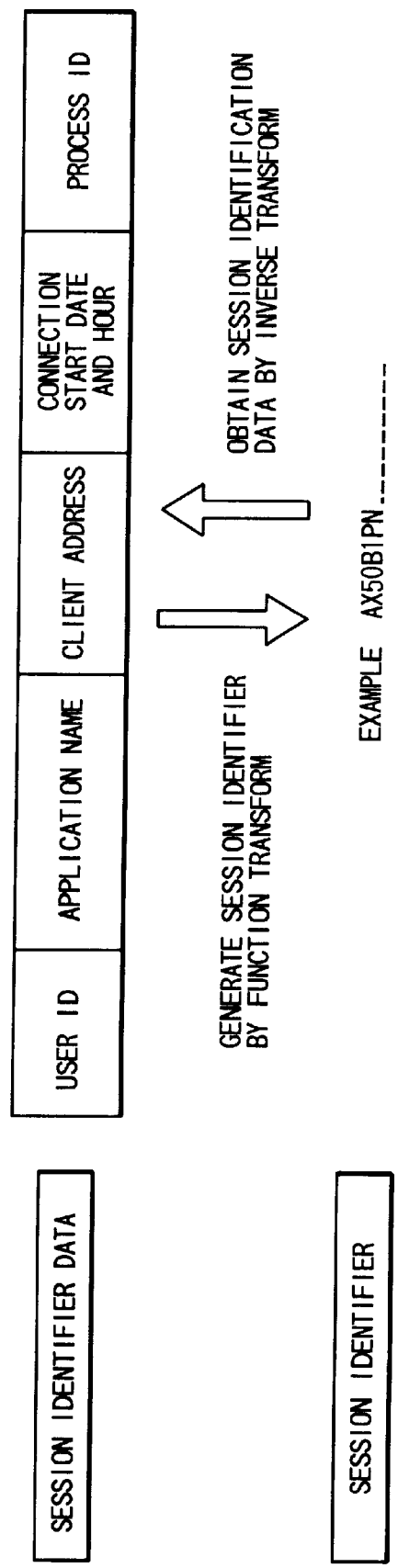
FIG. 17 is a diagram showing an example of a method of generating a session identifier.

FIG. 17 is a diagram showing a method of generating the session identifier.

As shown in FIG. 17, the session identifier can be generated while uniquely determined by converting the session identifier data 211 on the basis of a predetermined function.

Subsequently, the client program 20 reads the relay computer indicating file 28 from the fixed disk 22 and stores it as the relay computer indicating table 210 into the memory 23 (step 63). Thereafter, the client program 20 determines the address of a relay computer 13 serving as a connection destination (target) on the basis of the relay computer indicating table 211, and transmits a connection request to the relay computer 13 thus determined (step 64).

When the client program 20 succeeds in establishing the connection with the relay computer 13 (step 65), the client program 20 transmits the session identifier generated in step 62 to the relay computer 13.

The relay computer 13 transmits a connection request to a relay computer 13 serving as a next connection target or the server computer 16 as described later. Therefore, when the establishment of the connection between the server computer 16 and the relay computer 13 just before the server computer 16 (hereinafter referred to as "just-preceding relay computer 13"), a session establishment success/failure reply which indicates the success in establishing the session between the client and the server is transmitted from the just-preceding relay computer 13 via one or more relay computers 13. When the connection establishment between the server computer 16 and the just-preceding relay computer 13 fails, a session establishment success/failure reply which indicates the failure to establish the session between the client and the server is transmitted from the just-preceding relay computer 13 via one or more relay computers 13.

When receiving the session establishment success/failure reply (step 67), the client program 20 executes the processing inherent to the application program (step 69) if the received session establishment reply indicates the success in establishing the session between the client and the server (step 68).

Figure 7:
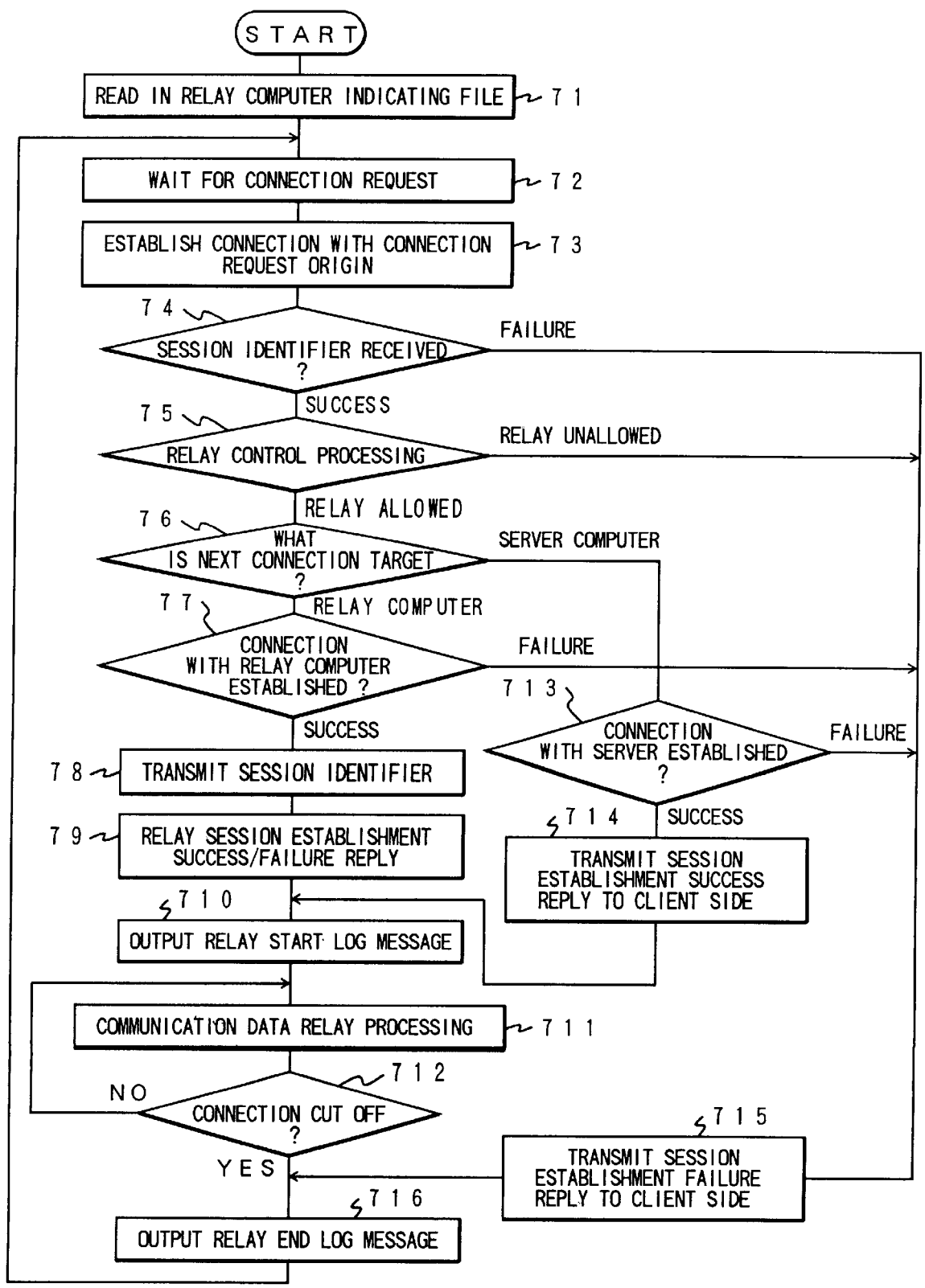
FIG. 7 is a flowchart showing the processing of a relay program which is started in the relay computer.

FIG. 7 is a flowchart showing the processing of the relay program 17 which is started in the relay computer 13.

The relay program 17 is started upon boot-up process of the relay computer 13, and stored as the relay module 311 into the memory 33 to implement the processing shown in FIG. 7.

That is, as shown in FIG. 7, the relay program 17 reads the relay computer indicating file 310 from the fixed disk 32 and stores it as the relay computer indicating table 313 into the memory 33 (step 71). Thereafter, the process shifts to a standby state of the connection request from the client computer 15 or another relay computer 13 (step 72).

Thereafter, when receiving the connection request from the client computer 15 or another relay computer 13, the relay program 17 establishes the connection with the computer of the connection-request origin (step 73).

When the relay program 17 receives a session identifier transmitted from the computer after the connection with the computer of the connection-request origin is established, it stores the session identifier as a session identifier 314 into the memory 33 (step 74).

When the relay program 17 fails to receive the session identifier, for example, when no session identifier is transmitted from the computer of the connection origin, the relay program 17 transmits the session establishment success/failure reply indicating the failure to establish the session between the client and the session to the computer of the connection origin (step 715). Thereafter, the process goes to step 716. Subsequently, the relay program 17 executes the relay control processing (step 75).

Here, the relay control processing is meant to be the user authentication/access control processing and the processing of determining the address of a computer serving as a next connection target on the basis of the address of the server computer 16 serving as a destination of established session and the relay computer indicating table 313, and transmitting the connection request to the computer concerned to establish the connection with the computer concerned. When the relay program 17 judges that the relay of the data of an application program (application data) which a user starts is not permitted because the user is not a registered one or the like, the session establishment success/failure reply indicating the failure to establish the session between the client and the server is transmitted to the computer of the connection origin (step 715), and then the process goes to step 16.

As a result of the relay control processing, when the computer serving as the next connection target is another relay computer 13 (step 76) and the establishment of the connection with the relay computer 13 concerned succeeds (step 77), the relay program 17 transmits the session identifier 314 received in step 74 to the relay computer 13 concerned (step 78).

Thereafter, the session establishment success/failure reply is transmitted from the relay computer 13 serving as the connection origin, and thus the relay program 17 transmits the received session establishment success/failure reply to the computer serving as the connection origin (step 79) and then goes to step 710.

If the relay computer 13 serving as the connection target is the relay computer 13 just before the server computer 16 (i.e., the just-preceding relay computer 13), the session establishment success/failure reply is transmitted from the relay computer 13 concerned. Further, if the relay computer 13 serving as the connection target is not the just-preceding relay computer 13 of the server computer 16, the session establishment success/failure reply is transmitted via the relay computer 13 concerned from the relay computer 13 just before the server computer 16.

Further, when the establishment of the connection with the relay computer 13 serving as the connection target fails (step 77), the relay program 17 transmits the session establishment success/failure reply indicating the failure to establish the session between the client and the server to the computer serving as the connection origin (step 715) and then goes to step 716.

On the other hand, as a result of the relay control processing, if the computer serving as a next connection target is the server computer 16 (step 76) and the establishment of the connection with the server computer 16 succeeds (step 713), the relay program 17 transmits the session establishment success/failure reply indicating the success in establishing the session between the client and the server to the computer serving as the connection origin (step 714) and then goes to step 710.

If the establishment of the connection with the server computer 16 fails (step 713), the relay program 17 transmits to the computer serving as the connection origin the session establishment success/failure reply indicating the failure to establish the session between the client and the server (step 715) and then goes to step 716.

In step 710, the relay program 17 outputs a log message indicating the relay start of the application data to the log file 38 in such a format that the session identifier is added to the log message.

Thereafter, the relay program 17 performs the communication data relay processing (step 711) of transmitting the application data received from the computer serving as the connection origin (the client computer 15 or a relay computer 13 at the client computer 15 side) to the computer serving as the connection target (the server computer 16 or a relay computer 13 at the server computer 16 side), and transmitting the application data received from the computer serving as the connection target to the computer serving as the connection origin.

When the application program which the user starts is finished, the connection on the communication path is cut off. Therefore, the relay program 17 executes the communication data relay processing until the connection is cut off (step 712), and when the connection is cut off (step 712), the program goes to step 716.

In step 16, the relay program 17 outputs a log message indicating the end of the relay of the application data to the log file 38 in such a format that the session identifier is added to the log message. Even during the communication data relay processing, the relay program 17 outputs the log message with the session identifier to the log file 38 in accordance with the status.

The above-described processing is the processing of the relay program 17 for one session between the client and the server. After the processing is finished, the relay program 17 returns to the step 72 to wait for the start of the processing for another session.

By the processing of the client program 20 and the relay program 17, a log message which is added with a session identifier for identifying the session between the client and the server is stored as a log file 38 in the fixed disc 32 of each relay computer 13.

Next, there will be described the log management which the network administrator performs by using one management computer 14 when the log message with the session identifier is stored as a log file 38 in the fixed disk 32 of each relay computer 13 as previously stated.

Figure 5:
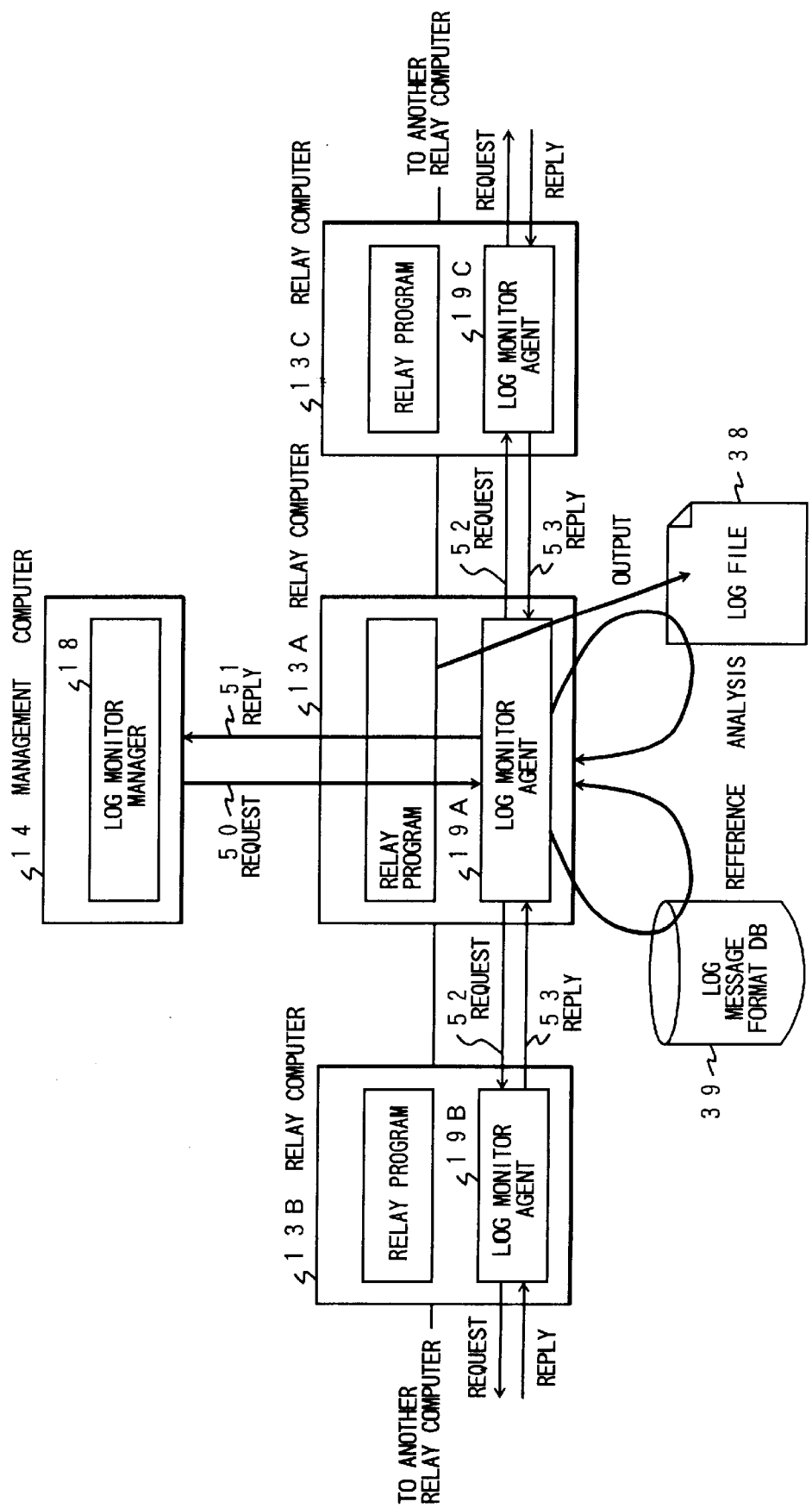
FIG. 5 is a diagram showing cooperation processing between a monitor manager program which is started in a management computer and a log monitor agent program which is started in a relay computer, and cooperation processing between log monitor agent programs.

FIG. 5 is a diagram showing the cooperation processing between the log monitor manager program 18 executed by the management computer 14 and the log monitor agent program 19 executed by the relay computer 13, and the cooperation processing between the log monitor agent programs 19.

As shown in FIG. 5, in the management computer 14, the log monitor manager program 18 requests the log check to a log monitor agent program 19A executed by a relay computer 13A which belongs to the same network as the management computer 14 concerned (request 50).

In the relay computer 13A, when the log check is requested from the log monitor manager program 18, the log monitor agent program 19A analyzes the log file 38 stored in the relay computer 13A concerned while referring to the log message format DB39 stored in the memory 33 of the relay computer 13A concerned.

If the analysis result satisfies the check request of the log monitor manager program 18, the log monitor agent program 19A transmits the analysis result as a check result to the log monitor manager program 18 (reply 51). If the analysis result does not satisfy the check request of the log monitor manager program 18, the log monitor agent program 19A requests the log check to the log monitor agent programs 19B, 19c which are started in adjacent relay computers 13B, 13C (request 52).

When the log check is requested from the log monitor manager program 19A to each of the log monitor agent programs 19B, 19C, in the relay computers 13B, 13C, the log monitor agent programs 19B, 19C analyze the log files 38 stored in the relay computers 13B, 13C thereof respectively while referring to the log message format DB39 stored in the relay computers 13B, 13C.

If the analysis result satisfies the check request of the log monitor agent program 19A, each of the log monitor agent programs 19B, 19C transmits the analysis result as a check result to the log monitor agent program 19A (reply 53). On the other hand, if the analysis result does not satisfy the check request of the log monitor agent program 19A, the log check is requested to the log monitor agent program 19 (not shown) which is started in another further adjacent relay computer 13.

Figure 8:
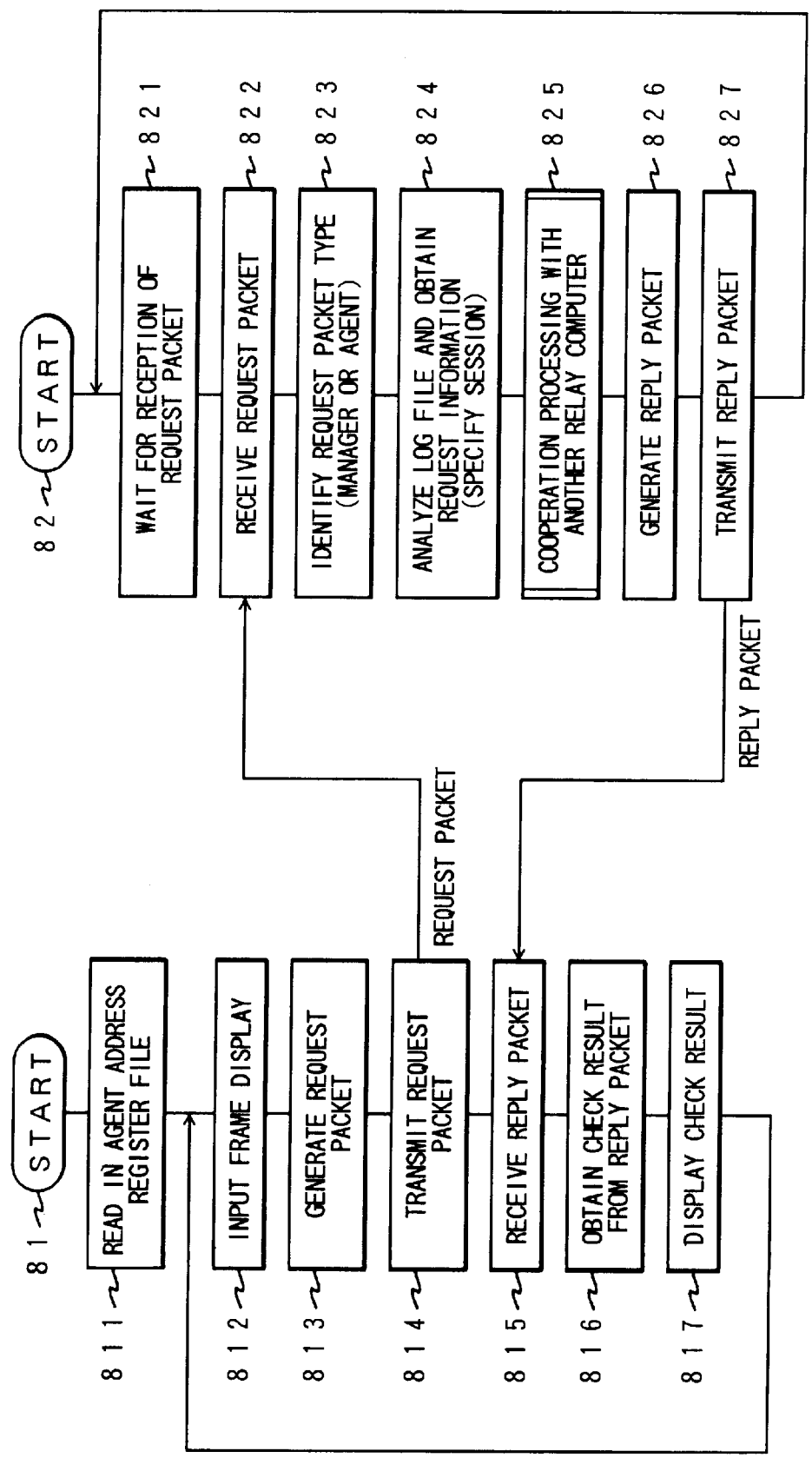
FIG. 8 is a flowchart showing the processing of the log monitor manager program and the log monitor agent program, and the association between both the processing.

FIG. 8 is a flowchart showing the processing of the log monitor manager program 18 and the processing of the log monitor agent program 19, and the relationship between both the processing.

First, the processing of the log monitor manager program 18 will be described. in the session identifier field 113, the number of replied data is set in the data number field 114, and the reply data of each reply computer 13 which makes a reply are set in the data field 115. As shown in FIG. 11B, the data field 115 is constituted by the address 116 of a relay computer 13 which replies with the data thereof, and reply data 117 indicating the content corresponding to the request information. Finally, the log monitor manager program 18 displays the check result obtained in step 816 on the display (step 817).

FIG. 12 shows an example of the output frame of the check result.

On the display frame shown in FIG. 12, the log monitor manager program 18 displays on the session identifier column 121 the session identifier set in the session identifier field 113 of the reply packet 111, displays on the reply computer address column 122 the address 116 of a relay computer 13 which is set in the data field 115 of the reply packet 111, and displays at a suitable place of the request information item column 123 the reply data 118 of the relay computer 13.

When multiple relay computers 13 make a reply for one session, the log monitor manager program 18 displays the address 116 of each relay computer 13 and the reply data 118. Further, when two or more sessions are specified on the basis of the search condition, the log monitor manager program 18 displays each of the check results on these sessions.

Next, the processing of the log monitor agent program 19 will be described.

The log monitor agent program 19 is started upon boot-up process of the relay computer 13, and stored as the log monitor agent module 312 into the memory 33 to thereby implement the processing indicated by "82" of FIG. 8. requested) from the agent address data 49, and transmits the request packet generated in step 813 to the relay computer 13 thus determined to request the log check (step 814).

FIG. 10 is a diagram showing an example of the format of the request packet which is transmitted from the log monitor manager program 18 to the relay computer 13.

In the request packet 101, as shown in FIG. 10, the log monitor manager program 18 sets in a request information number field 102 the number corresponding to the request information set in a request information column 91; sets in a search condition number field 103 the number of search conditions set in a search condition column 92; and sets in a search condition item number field 104 and a condition data field 105 the number corresponding to the search condition set in the search condition column 91 and the condition data respectively. The request information number and the detection condition number are defined beforehand.

After the transmission of the request packet, the log monitor manager program 18 waits for the reply packet which is transmitted from the relay computer 13 (step 815), and then obtains the check result from the reply packet when the reply packet is received (step 816).

Figure 11A:
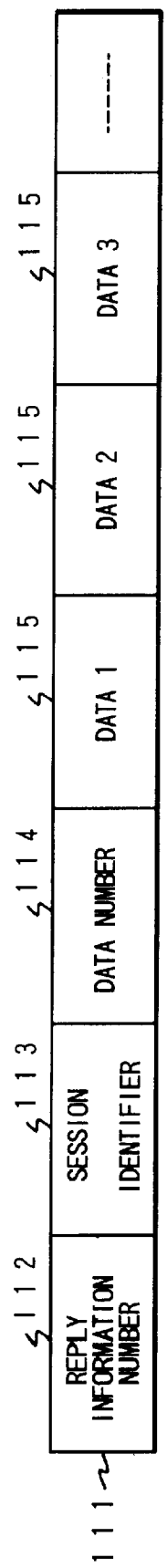
FIG. 11A is a diagram showing an example of the format of a reply packet which the log monitor manager program receives from a relay computer.
Figure 11B:
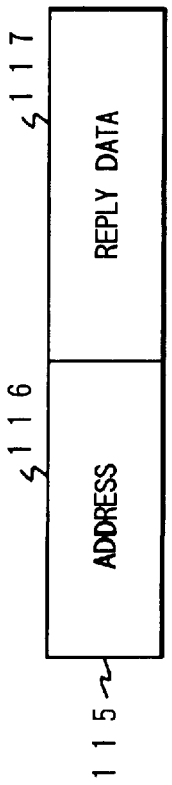
FIG. 11B is a diagram showing an example of the format of a reply packet which the log monitor manager program receives from a relay computer.

FIG. 11A and FIG. 11B are diagrams showing examples of the format of the reply packet which the log monitor manager program 18 receives from the relay computer 13.

As shown in FIG. 11A, in the reply packet 111, the number (which is identical to the request information signal) corresponding to the reply information is set in the reply information number field 112, the session identifier of a session which is specified on the basis of the search condition is set The log monitor manager program 18 is started upon boot-up process of the management computer 14, and is stored as the log monitor manager module 48 into the memory 43 to implement the processing as indicated by "81" of FIG. 8.

That is, the log monitor manager program 18 first reads out the agent address register file 47 from the fixed disk 42, and stores the agent address register file 47 as agent address data 49 into the memory 43 (step 811).

Subsequently, the log monitor manager program 18 displays on the display a display frame for inputting an instruction of the log check by the network administrator, and receives the input from the network administrator (step 812).

FIG. 9 is a diagram showing a display frame for inputting the log-check instruction by the network administrator.

In the case of FIG. 9, the network administrator inputs the log-check instruction by setting request information indicating the content which is desired to be checked and a search condition which is needed to obtain the content.

For example, in order to know a user who accessed on Aug. 8, 1996 by telnet, the network administrator sets "user ID" on a request information column 91, "telnet" on an application name column 93 of a search condition column 92, and "from 0 hour, 0 minute, 0 second on Aug. 8, 1996 to 23 hours, 59 minutes, 59 seconds on Aug. 9, 1996" on a connection time range column 94 of the search condition column 92 on the display frame shown in FIG. 9.

Subsequently, the log monitor manager program 18 generates a request packet on the basis of the request information received in the step 812 and the search condition (step 813), determines the address of a relay computer 13 serving as a request target (i.e., a relay computer to which the log check is That is, when the log monitor agent program 19 receives the request packet (step 822) in the state where it is on standby to receive the request packet (step 821), it judges on the basis of the type of the packet whether the transmission origin of the request packet is the log monitor manager program 18 which is executed in the management computer 14 or the log monitor agent program 19 which is executed in the relay computer 13 (step 823).

The request packet which is transmitted from the log monitor manager program 18 is a type of request packet 101 having the format shown in FIG. 10, and the request packet transmitted from the log monitor agent program 19 is a type of request packet having the format shown in FIG. 15, as described later, and thus the log monitor agent program 19 can discriminate both of the request packets from each other.

When the log monitor manager program 18 is the transmission origin, the request information can be known on the basis of the number which is set in the request information number field 102 of the request packet 101, and the search condition can be known on the basis of the number and the condition data, which are set in the search condition item number field 104 and the condition data field 105 of the request packet 101. Therefore, the log monitor agent program 19 analyzes the content of the log file 38 which is stored in the fixed disk 32, thereby specifying the session which meets these search conditions and gaining the session identifier of the specified session and the content corresponding to the request information (step 824).

At this time, under certain search conditions and with certain request information, there are some cases where it is sufficient to analyze the session identifier in the log file 38, and there are some cases where the log message in the log file 38 must also be analyzed.

The analysis of the session identifier in the log file 38 can be performed by subjecting the session identifier to the inverse transform of a function which is used to generate the session identifier by the client program 20 to restore to the session identifier data, and the analysis of the log message in the log file 38 can be performed by using the log format DB39 stored in the fixed disk 32.

FIG. 13 is a diagram showing an example of the log format DB39.

As shown in FIG. 13, the log format DB39 is constituted by an information code defining table which defines information code corresponding to an item such as the date and time, the host name or the like and the string's length of the item, and a log message format table which defines the format of the log message by using the information code every item. For example, in FIG. 13, the log message format "#1 #2 #3 [#4]: connect from #6" means "date and time application name host name [process ID]: connect from connection origin".

On the other hand, when the log monitor agent program 19 is the transmission origin, the log monitor agent program 19 is not required to specify the session because the session identifier is given from the request packet concerned, as described later, and thus it is sufficient that the log monitor agent program 19 obtains only the content corresponding to the request information (step 824).

At this time, with some request information, there is a case where it is sufficient to analyze only the given session identifier, or there is a case where the log message added with the session identifier must also be analyzed.

Further, when the log monitor agent program 19 needs to request the log check to another relay computer 13 on the communication path, the cooperation processing with another relay computer 13 is performed by using the session identifier as a keyword (step 825). The details of the cooperation processing will be described later.

When it is impossible to specify the session identifier to only one session identifier in step 824, the log monitor agent program 19 performs each cooperation processing for these session identifiers.

After the cooperation processing is finished, the log monitor agent program 19 generates the reply packet to be returned to the management computer 14 or the relay computer 13 (step 826), and returns the generated reply packet (step 827).

When the reply packet is returned to the management computer 14, the log monitor agent program 19 generates the reply packet 111 having the format shown in FIG. 11A. On the other hand, when the reply packet is returned to the relay computer 13, the log monitor agent program 19 generates a request packet having the format shown in FIG. 16A and FIG. 16B as described later.

Here, the details of the cooperation processing of the step 825 of FIG. 8 will be described.

Figure 14:
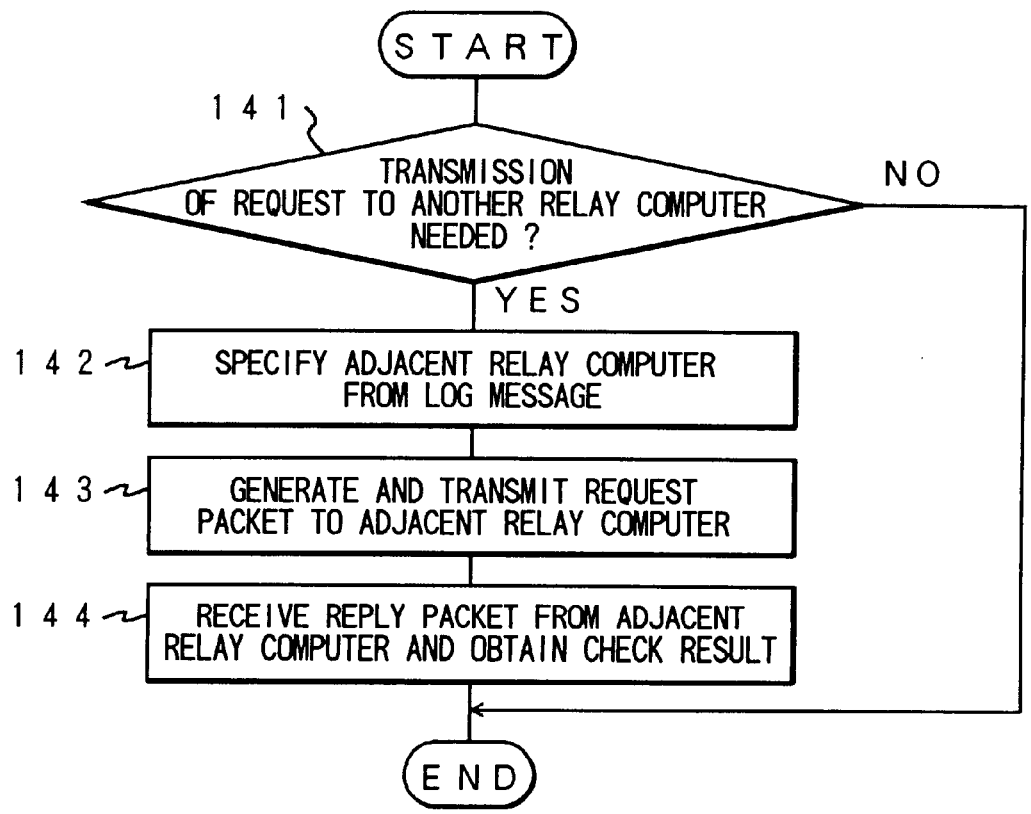
FIG. 14 is a flowchart showing the details of cooperation processing of step 825 of FIG. 8.

FIG. 14 is a flowchart showing the details of the cooperation processing.

As shown in FIG. 14, in the cooperation processing, the log monitor agent program 19 first judges whether the relay computer 13 is at the terminal (the relay computer 13 just before the server computer 16), and also determines it in consideration of the search condition, etc. whether it is necessary to transmit the request packet to the log monitor agent program 19 which is executed in another relay computer 13 (step 141).

When it is necessary to transmit the request packet to another log monitor agent program 19, the log monitor agent program 19 specifies another relay computer 13 on the communication path from the log message added with the session identifier of the session which is specified in step 824 of FIG. 8 (step 142).

The relay computer 13 thus specified has established the connection with the relay computer 13 concerned when the session specified in step 824 of FIG. 8. is established, that is, the adjacent relay computer 13 on the communication path which is associated with the session concerned. As described with reference to FIG. 7, the relay program 17 is set to output the log message at the start and finish times of the relay of the application data, so that the log monitor agent program 19 analyzes the log message to specify the relay computer 13 which has established the connection with the relay computer 13 concerned. However, the log monitor agent program 19 specifies a relay computer 13 other than the relay computer 13 serving as the transmission origin when the request packet is transmitted from the relay computer 13.

Subsequently, the log monitor agent program 19 generates the request packet to be transmitted to the relay computer 13 which is specified in step 142, and transmits the request packet thus generated (step 143).

Figure 15:
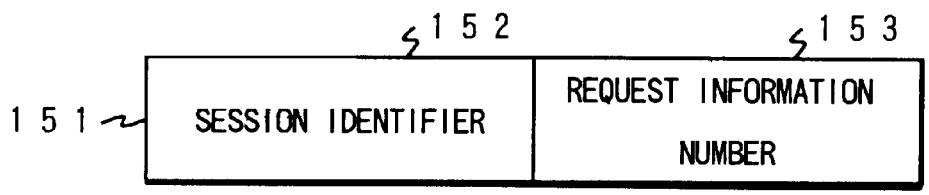
FIG. 15 is a diagram showing an example of the format of a request packet which the log monitor agent program transmits to another relay computer.

FIG. 15 is a diagram showing an example of the format of the request packet to be transmitted to another relay computer 13 from the log monitor agent program 19.

As shown in FIG. 15, the log monitor agent program 19 sets the session identifier of the session specified in step 824 of FIG. 8 in a session identifier field 152 in a request packet 151, and sets in a request information number field 153 the request information number which is set in the request information number field of the request packet received in step 822 of FIG. 8 (the request information number field 102 of the request packet 101 or the request information number field 153 of the request packet 151).

Finally, the log monitor agent program 19 receives the reply packet from the relay computer 13 serving as the request target (step 144).

FIG. 16A and FIG. 16B are diagrams showing examples of the format of the reply packet which the log monitor agent 19 receives from another relay computer 13.

As shown in FIG. 16A, in a reply packet 161, the session identifier of the session specified in step 824 of FIG. 8 is set in a session identifier field 162, the number corresponding to the reply information (which is identical to the request information number) is set in the reply information number field 163, the number of replied data is set in the data number field 164, the reply data of each relay computer 13 which makes a reply are set in a data field 165. As shown in FIG. 16B, the data field 165 is constituted by the address 166 of a relay computer 13 which replies the data thereof, and the reply data 167 indicating the content corresponding to the request information.

For example, in the corporation network 11 constituted as shown in FIG. 1, when the network administrator inputs a log-check instruction from the management computer 14b, the request packet 101 is transmitted from the management computer 14b to the relay computer 13b. At this time, if the session to be specified under the search condition is the session between the client and the server, in the relay computer 13b, the log monitor agent program 19b can specify this session because the relay program 17b relays this session, and the request packet 151 is transmitted from the relay computer 13b to the relay computer 13c. The reply packet 161 is returned from the relay computer 13c to the relay computer 13b, and the reply packet 111 is returned from the relay computer 13b to the management computer 14.

Further, for example when the network administrator inputs the log-check instruction from the management computer 14a in the corporation network 11 constituted as shown in FIG. 1, the request packet 101 is transmitted from the management computer 14a to each of the relay computers 13a to 13c. At this time, if the session to be specified on the basis of the search condition is the session between the client and the server, in the relay computers 13b, 13c the log monitor agent programs 19b, 19c can specify the session because each of the relay programs 17b, 17c relays the session between the client and the server. However, in the relay computer 13a the log monitor agent program 19a cannot specify the session because the relay program 17a does not relay the session.

As described above, if the request packet 101 is transmitted from the log monitor manager program 18, there is a case where the log monitor agent program 19 cannot specify the session even by analyzing the content of the log file 38. This means that the network administrator inputs from the management computer 14 belonging to the same network as the relay computer 13 concerned the log-check instruction associated with the session which is not relayed by the relay computer 13 concerned. Therefore, when the log monitor agent program 19 cannot specify the session, it returns to the management computer 14 the reply packet 111 having information which is preset to indicate the failure of the specification of the session.

As described above, according to this embodiment of the present invention, by using only one management computer 14, the network administrator can easily manage the logs which are dispersively recorded on the multiple relay computers 13 on the communication path.

As a specific example, the network administrator can specify an access route of the user, for example, which computer is accessed by which user (computer) in which connection time range. By checking the user ID of a user who accesses in the same connection time range and the access route thereof, it can be recognized that there was an unauthorized access by an unauthorized person who impersonates an authorized user if the access route is different irrespective of the same user ID.

Further, the network administrator can specify the relay computer 13 in which the log indicating occurrence of a communication problem is recorded, and thus the location at which the communication problem occurs can be specified.

Still further, the network administrator can inspect the log recorded in the relay computer 13 by checking whether there is a relay computer 13 which replies with the check result which is inconsistent with the check result of another relay computer 13.

What is claimed is:

1. A network system with a function of collectively managing dispersive logs, said network system includes multiple networks having relay computers and computers, and a network including said relay computers which are connected to one another, wherein communication between said computers which belong to different networks being performed via multiple relay computers of said relay computers, and a management computer, said management computer comprising:

means for receiving a log-check instruction and transmitting request information of the log check to a relay computer belonging to the same network as the computer concerned; and means for receiving result information of the log check and outputting the result information, wherein each of said relay computers comprises:
      log recording means for recording log information on a communication relayed by said relay computer and identifier information for identifying the communication while associating the log information and identifier information with each other,
      log check means for searching the log information corresponding to the request information of the log check which is received from said management computer or another relay computer and generating the result information of the log check,
      request information transmitting means for transmitting the request information of the log check to another relay computer, and
      means for transmitting the result information thus generated and the result information received from said other relay computer to a relay computer or a management computer which is a request origin.

2. The network system as claimed in claim 1, wherein said management computer belongs to any of the networks.

3. The network system as claimed in claim 1, wherein the request information of the log check is successively transferred among all the relay computers which relay the communication corresponding to the request information, and the result information of the log check is successively accumulated and transferred in a direction opposite to a transfer direction of the request information.

4. The network system as claimed in claim 1, wherein each of said computers comprises:

means for generating the identifier information for identifying a communication on a communication path when said computer establishes the communication path with another computer belonging to a network to which said computer concerned does not belong; and means for transmitting the identifier information to a relay computer which establishes a communication path with said computer concerned, and wherein said relay computer comprises:
      means for transmitting the identifier information received from said computer or another relay computer to another relay computer which establishes a communication path with said relay computer concerned.

5. The network system as claimed in claim 4, wherein the identifier information transmitted from said computer is generated so as to contain at least one of an identifier for a user of said computer concerned, the name of an application program which is started by the user, the date and time at which the communication path is established, the address of the network of said computer concerned and a process identifier which is added at the start time of the application program.

6. The network system as claimed in claim 4, wherein said request information transfer means of said relay computer transmits the identifier information corresponding to the received request information as request information of log check, and said log check means of said relay computer searches the log information based on the identifier information when the identifier information is received as the request information of the log management.

7. The network system as claimed in claim 4, wherein said request information transmitting means of said relay computer judges based on the storage content of said log recording means whether there is a relay computer to which the request information should be transmitted.

\* \* \* \* \*